Dec. 15, 1970   R. J. SARGENT   3,546,752
CLASP ASSEMBLY
Filed March 21, 1969
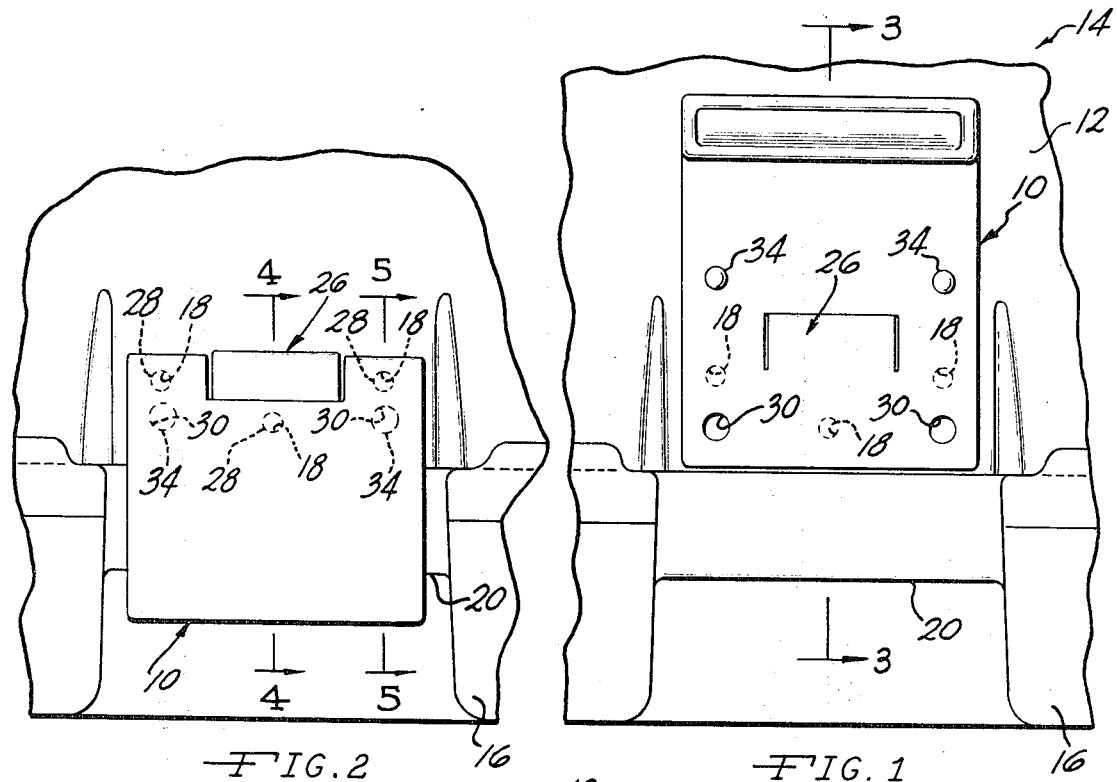
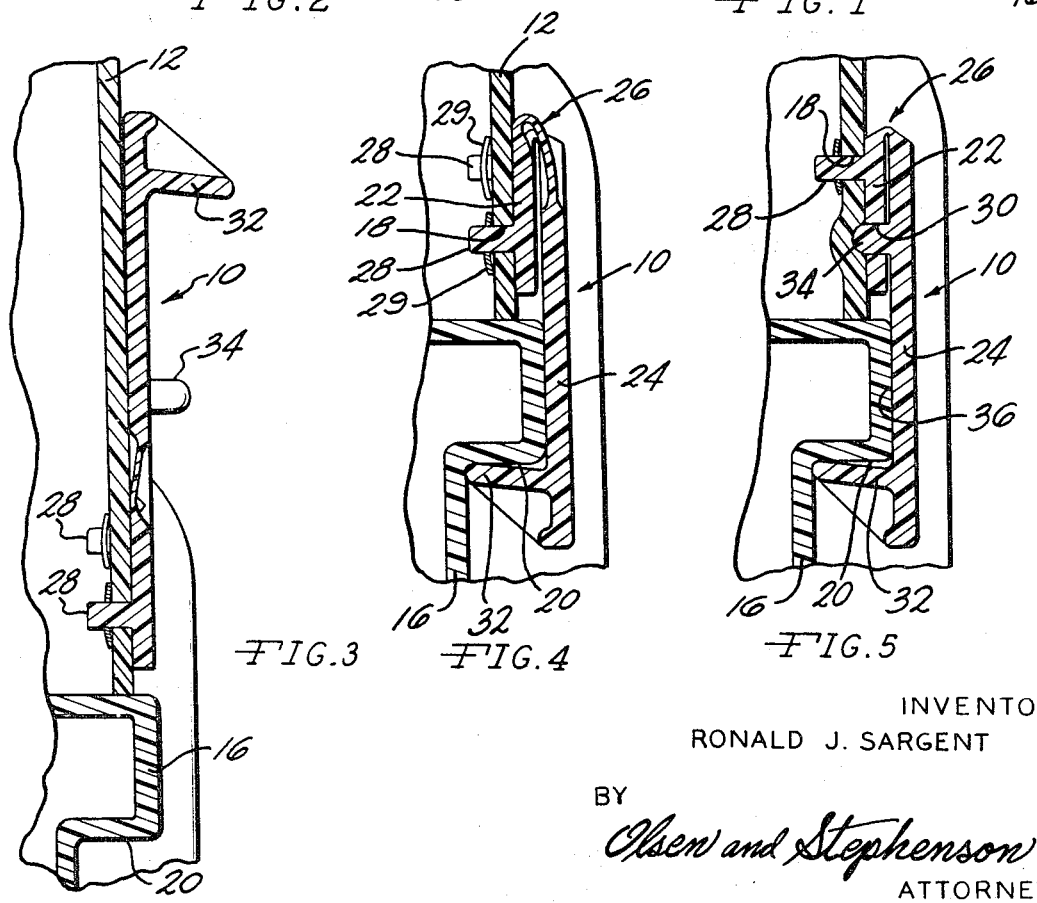
INVENTOR
RONALD J. SARGENT
BY
*Olsen and Stephenson*
ATTORNEYS

United States Patent Office 3,546,752
Patented Dec. 15, 1970

3,546,752
CLASP ASSEMBLY
Ronald J. Sargent, Ann Arbor, Mich., assignor to Thetford Corporation, Ann Arbor, Mich., a corporation of Michigan
Filed Mar. 21, 1969, Ser. No. 809,224
Int. Cl. A47k *13/26;* B65d *43/16*
U.S. Cl. 24—73　　　　　　　　　　　　　　　　10 Claims

ABSTRACT OF THE DISCLOSURE

Apparatus for clasping two members together such as upper and lower sections of a portable toilet. A unitary clasp of thermoplastic material is provided having two hingedly connected plates, one of which is connected to one member and the other of which is connected by a clasp element to the other member. The two plates are interconnected when closed so that the hinge connection between the plates is not stressed when a load is transmitted from one member to the other member via the clasp.

CROSS REFERENCE TO RELATED APPLICATION

The present clasp assembly is primarily, but not exclusively adapted for use in combination with a portable toilet of the type disclosed in pending U.S. application Ser. No. 724,071, filed Apr. 25, 1968 in the name of Ronald J. Sargent et al.

BACKGROUND OF THE INVENTION

The present invention relates to a clasp for releasably securing together two separable members, such as upper and lower sections of a portable toilet.

One of the more significant design innovations made possible with the introduction of polypropylene was the development of the concept of an integral or unitary hinge. Molded products can now be provided wherein the hinge has spring action for snapping the hinge to either an open or a closed position. One such construction can be found in the U.S. patent to Wolf, No. 3,289,877, granted Dec. 6, 1966. However, unitary hinges of the type disclosed in this patent are limited to such applications wherein loads will not be transmitted through the unitary hinge from one to another of the two hingedly connected members. The present invention is directed to an integral or unitary clasp formed of thermoplastic material which utilizes as a part of its structure a hinge, and which is constructed and arranged so that loads can be transmitted through the clasp from one to the other of the clasped parts.

According to one form of the present invention, a unitary clasp of thermoplastic material is provided for fastening two members together, one of which has a plurality of post holes and the other which has a clasp-engagement surface. The unitary clasp comprises first and second plates hingedly joined together, the first plate having a plurality of posts projecting from one surface for insertion into the post holes of one of the members, the second plate having a clasp element projecting from the other surface adjacent to its distal end for clasping the clasp-engagement surface of the other member. When the two plates are in their closed positions, a plurality of support pins, projecting from one of the plates will be fitted securely into a plurality of support-pin holes located in the other of the plates. Thus, when a load is transmitted from one of the members to the other, the load can be transmitted through the clasp without stressing the hinge portion of the clasp.

Thus, it is an object of the present invention to provide an improved unitary clasp formed of thermoplastic material.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a fragmentary front elevation of two members of a portable toilet mounted together, and illustrating a unitary clamp in an open position, mounted for clamping such members together;

FIG. 2 is a fragmentary front elevation, similar to FIG. 1, but showing the clasp in its closed position;

FIG. 3 is a fragmentary section taken on the line 3—3 of FIG. 1;

FIG. 4 is a fragmentary section taken on the line 4—4 of FIG. 2; and

FIG. 5 is a fragmentary section taken on the line 5—5 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The clamp 10 is shown in FIG. 1 mounted in an open position on the upper section or member 12 of a portable toilet 14. The upper section or member 12 is seated on a lower section or member 16 which serves as a holding tank for the toilet. The portable toilet 14 is disclosed in the aforesaid U.S. application Ser. No. 724,071 to which reference is made for a detailed description thereof. As disclosed in said application, latch mechanisms or clasps are located on opposite sides of the toilet for clasping the upper and lower sections or members together so that they can be moved as a unit, if desired, and also to maintain an effective seal between the upper section 12 and the holding tank section 16. The clasp 10 of the present application is a modified form of such mechanisms or clasps, and is primarily adapted for such use, although it can be used in other similar arrangements without departure from the present invention.

In the illustrated embodiment of the invention, the upper section or member 12 has a plurality of post holes 18 in its front wall for mounting the clasp 10. Similarly, the lower section or member 16 has a clasp-engagement surface or shoulder 20 adapted to be engaged by a clasping element of the clasp 20, as will presently be described.

The unitary clasp 10 is preferably formed from a suitable thermoplastic material, such as polypropylene, and it has a first plate 22 and a second plate 24 hingedly connected by a hinge connection 26. The details of the hinge connection 26 will not be set forth at length in this application because they can be found in the aforesaid U.S. patent to Wolf, No. 3,289,877, granted Dec. 6, 1966. From an examination of this patent, it will be recognized that the hinge connection 26 functions to snap the second plate 24 to the closed position shown in FIGS. 2, 4 and 5, or to the open position shown in FIGS. 1 and 3.

The first plate 22 has a plurality of posts 28 projecting from its one surface and extending through the post holes 18. Suitable lock means, such as the push-on lock nuts 29 are provided to lock the first plate 22 in a fixed position relative to the upper or first section or member 12. Extending through the plate 22 are a plurality of support pin holes 30 for a purpose to be described.

The second plate 24 has projecting transversely from a location adjacent to its distal end a clamping element 32, which, when the plate 24 is pivoted to its closed position will be fitted securely into clamping engagement with the clamp engagement surface or shoulder 20 of the lower section or member 16. Also projecting from the plate 24 are a plurality of support pins 34 which are adapted to extend through the support pin holes 30 in the first plate 22. Thus, the support pins 34 and the clasp element 32 may be considered to project from what is termed the other side 36 of the plate 24.

By virtue of the construction and arrangement of the clasp 10 and its mounting on the upper section or member 12 and clasping of the shoulder 20, a relatively rigid structure is provided so that when a load is applied to the upper member 12, for example, such as lifting of the upper section 12, the load will be transmitted through the clasp 10 without stress being imparted thereby to the hinge connection 26. Thus, a vertical load tending to separate the sections or members 12 and 16 will be transmitted to the clasp element 36, through a portion of the plate 24 to the support pins 34, then to the plate 22 and from there through the pins 28 to the upper section or member 12. This construction and arrangement permits a low cost clasp to be used which is a unitary, integral structure, which can readily be attached to one member, such as the upper member 12 of the toilet 10, and the clasp can then be pivoted to its closed position in which the clasp element 32 is in clasping engagement with the shoulder 20 thereby securely fastening together the two members 12 and 16. The two members can readily be separated merely by releasing the two clasps 10 from their respective shoulders 20.

It is claimed:

1. A unitary clasp of thermoplastic material for fastening two members together, one of which as a plurality of post holes and the other of which has a clasp-engagement surface, comprising first and second plates hingedly joined together, the first plate having a plurality of posts projecting from one surface for insertion into said post holes, the second plate having a clasp element projecting from its other surface for clasping said clasp-engagement surface when the second plate is pivoted to a closed position in which its other surface is adjacent to the other surface of said first plate, and one of said plates having a plurality of pin holes and other of said plates having a plurality of support pins projecting from its other surface into said pin holes when the plates are in said closed position.

2. A unitary clasp as is defined in claim 1 wherein said support pins project from said other surface of the second plate.

3. A unitary clasp as is defined in claim 1 wherein said clasp element is a transverse flange adjacent to the distal end of said second plate.

4. A unitary clasp as is defined in claim 1, wherein said posts and said pins are normal to the surfaces from which they project.

5. A unitary clasp of thermoplastic material for releasably fastening two members together one of which has a plurality of post holes and the other of which has a clasp-engagement shoulder, comprising first and second plates hingedly connected together, the first plate having a plurality of posts projecting perpendicularly from one surface for insertion into said post holes and having a plurality of support pin holes, the second plate having a clasp element in the form of a transverse flange projecting from its other surface for clasping said shoulder and having a plurality of support pins projecting perpendicular from its other surface for fitting into said support pin holes when the second plate is pivoted to a closed position in which its other surface is adjacent to the other surface of said first plate.

6. In combination, first and second members positioned together with walls abutting generally in a common plane, one of said members having post holes extending through its wall and the other member having a clasp-engagement shoulder facing away from the juncture of such walls, a unitary clasp of thermoplastic material for releasably fastening said two members together, said clasp having first and second plates hingedly connected together and movable between open and closed positions, the first plate having a plurality of posts projecting from one of its surfaces fitting into said post holes, the second plate having a clasp element in the form of a flange projecting from one of its surfaces for clasping said shoulder when the clasp is in its closed position, and said plates having support pins and pin holes in mating relation when the clasp is in said closed position.

7. The combination as is defined in claim 6, wherein said pin holes are located in said first plate and said support pins are projections from said second plate.

8. The combination as is defined in claim 6, wherein said posts project through said post holes, and lock means are provided on said posts locking the first plate in place.

9. The combination as is defined in claim 8, wherein said lock means are push-on lock nuts.

10. The combination as is defined in claim 6, wherein said support pins and said posts are oriented so that a force applied to one of said members in a direction away from the other member will be transmitted through said clasp via said pins and clasp element so as to avoid stressing the hinge connection between said plates.

References Cited
UNITED STATES PATENTS 3,289,877    12/1966    Wolf _____ 220—31

DONALD A. GRIFFIN, Primary Examiner

U.S. Cl. X.R.
4—134; 220—31